J. H. PILLINGS.
AUTOMATIC OPERATING DEVICE FOR TYPE WRITERS.
APPLICATION FILED OCT. 13, 1913.

1,213,688.

Patented Jan. 23, 1917.
7 SHEETS—SHEET 7.

Witnesses
Howard Walmsley
B. L. Hammaker

Inventor
John H. Pillings
By
Toulmin & Reed
Attorneys

UNITED STATES PATENT OFFICE.

JOHN H. PILLINGS, OF DAYTON, OHIO, ASSIGNOR OF ONE-HALF TO BENJAMIN H. NOYES, OF DAYTON, OHIO.

AUTOMATIC OPERATING DEVICE FOR TYPE-WRITERS.

1,213,688.            Specification of Letters Patent.        Patented Jan. 23, 1917.

Application filed October 13, 1913. Serial No. 794,775.

*To all whom it may concern:*

Be it known that I, JOHN H. PILLINGS, a citizen of the United States, residing at Dayton, in the county of Montgomery and State of Ohio, have invented certain new and useful Improvements in Automatic Operating Devices for Type-Writers, of which the following is a specification, reference being had therein to the accompanying drawing.

This invention relates to automatic operating devices for typewriters and other machines requiring selective operation and is in the nature of an improvement upon the device shown and described in the application for patent filed by me September 29th, 1913, Ser. No. 792,368.

The object of the invention is to simplify the construction and operation of the device therein shown and described without in any way detracting from its advantages or the results accomplished thereby.

To this end it is a further object of the invention to eliminate as many parts as possible and to make the connection between the actuating device and the controlling device a direct one; and further, to so construct the controlling device itself that in manufacturing and assembling the device the parts can be readily positioned to form the transverse slots in the desired relation one to the other and to the mechanism as a whole. It will be understood that in devices of this kind it is desirable that the slots or other guides for the trip devices should be exactly at right angles to the line of travel of the controlling device. Otherwise, the trip devices will overlap each other and two or more actuating bars will be caused to operate simultaneously.

A further object of the invention is to provide a controlling device, the length of which can be regulated to accommodate the same to letters of different length; and also to provide a gage for setting the device which can be adjusted relatively to the controlling device during the setting up operation.

A further object of the invention is to provide a device of this kind, the several parts of which will be so constructed and arranged that they will be strong and durable and will not be liable to become disarranged in the normal operation of the device.

In the accompanying drawings.

In these drawings I have illustrated one embodiment of my invention and have shown the same as mounted upon a main frame 1 which supports the automatic operating mechanism and also the typewriter, 2, which is to be operated. This typewriter may be of any ordinary or suitable construction and as here shown comprises the usual key bars 4 which operate type bars in a well known manner.

The typewriter may comprise any or all of the usual key-operated devices and it will be understood that the term "key bar" as herein employed has reference not only to the key bars for actuating the type bars but to any device which is manually actuated to operate some part of the mechanism.

The operating mechanism as a whole comprises two separate mechanisms, one a selective actuating mechanism which selects and actuates the key bars and the other a controlling mechanism or device which controls the selection of the key bars. In that form of the device here shown the selective actuating mechanism comprises a series of separately operable actuating devices, each of which is operatively connected with one of said key bars. Each of the actuating members is capable of two separate movements, one an operative movement to cause the operation of one of the key bars and the other an inoperative movement which has no effect upon the key bars. In that form of the device here illustrated inoperative movement is continuously imparted to the several actuating members. To cause the operation of the key bars means are provided, in form of a controlling device to be hereinafter described, to successively interrupt the inoperative movement of the actuating members and transform the same into operative movement. The interruptions of the actuating members take place successively and in a predetermined order and causes the operable parts of the typewriter to be operated in the order necessary to produce the desired letter or other written matter. These actuating devices may consist of actuating levers, as shown at 5, and these levers are preferably pivotally supported between their ends upon a shaft 6 to which reciprocatory movement is constantly imparted. The levers are connected at their forward ends with the respective type bars, the connections being made in such a manner that the normal movement of the levers will not affect the key bars. As here shown the connection is formed by means of a link 7 having a hook-shaped upper end which hooks loosely over the key bar and is of such a character that the key bar can be operated independently of the link, thus enabling the typewriter to be operated in the usual manner without detaching the automatic mechanism. The lower end of each link 7 is also slotted to receive the adjacent end of the corresponding lever. Preferably, a slotted member 8 is adjustably secured to the body portion of the link, by means of a screw-threaded connection, or otherwise, and the lower end of this slotted member projects downward in the form of a finger 9 which extends through a slot 10 formed in the flange 11 carried by a bar 12 extending transversely of the machine. It will be understood that the flange 11 has a slot 10 for each link and that the fingers 9 of the link extend into the slots and have reciprocatory movement therein to guide the links in their movements. To enable a link to be readily separated from its lever to permit it to be removed or its length adjusted I preferably close the outer ends of the slots by means of a movable strip or bar 13 which is here shown as pivotally mounted at each end near its outer edge upon brackets 14 and as held normally with its edge in a position to close the slots 10 by means of a clip or fastening device 15. By shifting this clip the bar 13 can be moved about its axis and the fingers at the lower ends of the links removed from their guiding slots 10. Preferably, the actuating levers 5 during their normal movements fulcrum at their forward ends. One end of the slot in the link 7 may form this fulcrum but I prefer that the lever should be fulcrumed in the rear of the links, as here shown. To accomplish this the bar 12 extends upwardly in the rear of the lower portions of the several links and is provided with a series of slots 16 corresponding in number to the actuating levers 5.

Mounted in the bar 12 and extending into each slot is a spring 17 upon which the corresponding lever 5 rests and which forms a fulcrum for that lever. If desired, a bearing point, such as a screw 18, may be provided in the upper end of the slot about which the lever will move. The arrangement of the fulcrum is such that in its normal operation the forward end of the lever will not engage the lower wall of the slot in the link 7 and, consequently, the key bar will not be affected by the normal movement of the lever. The normal reciprocatory movement may be imparted to the several actuating levers in any suitable manner. As here shown the shaft 6 is mounted in a frame 19 which is secured at its opposite ends to arms 20 having at their upper ends eccentric straps 21 extending about eccentrics 22 which are rigidly secured to a shaft 23 which is rotated by means of a suitable power mechanism. In the present instance the shaft 23 is provided with a belt wheel 24 about which a suitable driving belt passes. The lower end of each arm 20 is pivotally connected to a slide block 25 mounted in a guideway 26 secured to the frame of the machine. The pivotal connection between the slide block and the arm 20 is below the center of the shaft 6 and consequently the swinging movement of the eccentric arm 20 will be transmitted in a reduced degree to the shaft 6 and the levers mounted thereon, for the purpose which will hereinafter appear.

The rear ends of the levers 5 are free to move vertically during the normal movement thereof. When it is desired to actuate a particular key bar the downward movement of the rear end of the lever connected with that key bar is interrupted and the continued downward movement of the shaft 6 causes the lever to fulcrum at its rear end upon the device which has interrupted its movement, and the forward end to be moved downward against the tension of the spring 17, thus causing the forward end of the lever to engage and actuate the link 7 by means of which it is connected with the key bar. Any suitable means may be provided for interrupting the movement of selected levers to cause corresponding key bars to be actuated. Preferably, this means is of such a character that it can be set up or adjusted to cause the levers to be actuated in such sequence that a given letter will be produced by the typewriter.

It will be understood that the term "letter" as herein employed is not to be limited strictly to a communication such as is ordinarily known as a "letter" but to any matter which it may be desired to reproduce upon the typewriter.

While it is preferable that this device for controlling the operation of the actuating bars should be adjustable it is possible to provide a controlling device in which the several parts shall occupy permanently fixed relations. Such a device can, of course, be used but for a single letter. I, therefore, prefer to so construct the controlling device that when the desired number of copies of a given letter have been produced the device can be reset to produce another letter. To this end I have provided the controlling device with a series of transversely extending guides on which are mounted tripping devices adapted to be moved successively into positions beneath the rear ends of the several actuating levers. In the present instance, the controlling device is made up of a plurality of sections detachably connected one to the other, thus enabling each section to be manufactured separately and the form set up thereon separately from the other sections. This is particularly desirable in the manufacture of the controlling device as it makes it comparatively easy to maintain the several guides in strict parallelism. In the present instance, the controlling device comprises a series of sections 27 of a width equal to the spread of the actuating levers and pivotally connected one to the other. This pivotal connection may be formed in any suitable manner but, as here shown, each section is provided at each end with a depending flange 28 having at one end a stud 29 and at the other end a bearing 30. A spring 31ª is secured to the flange and bears upon the end of the stud, which projects some distance beyond the face of the flange. By forcing the spring outward the apertured end of the flange of an adjacent section can be slipped over the stud 29 and will then be retained thereon by the spring 31. This construction, while shown for the purpose of illustration only, enables the several sections to be quickly and easily connected to or disconnected from one another and when connected forms a strong, durable connection having the desired degree of flexibility. The controlling device as a whole may be driven in any suitable manner but it is preferable that it should be timed with the movement of the actuating levers. I have, therefore, provided each section at both ends with a rack 31, which racks mesh with gears 32 secured to a shaft 33 which is driven from the shaft 23 by means of a shaft 34 connected by suitable worm gearing with the shafts 23 and 33. The guides may be formed in any suitable manner but in the present construction they are shown as comprising a series of transverse slots 35 in which are slidably mounted tripping devices 36 each having a wide base portion which is mounted in the slot and a reduced upper portion which projects beyond the upper edge of the slot.

There is one of the tripping devices mounted in each of the slots 35 and in setting up the device these slots are adjusted across the width of the controlling device in such a manner that they will cause the operation of the actuating levers in a predetermined order. Means are also provided for retaining the several tripping devices in their adjusted positions. To this end each section is provided with a slotted plate or cap 37, the slots of which extend parallel with the line of movement of the controlling device and correspond in number and arrangement with the actuating levers. Consequently, when the tripping devices have been set up and the cap 37 placed in position thereon each tripping device will project through one of the slots therein and will not only be held against lateral displacement but will also be retained in its slot. As the controlling device is slowly advanced the several tripping devices, or "trips," are brought directly beneath the rear ends of the corresponding actuating levers, thus preventing the downward movement of the rear ends of said levers and causing the forward ends to be actuated as above described.

In order that the lever and the trip may be maintained in engagement for a sufficient length of time to enable the lever to complete its movement the longitudinal movement above described is imparted to the lever. This movement is so timed that the lever and the trip will move together until the lever is raised out of engagement therewith. To further insure that the end of the lever and the trip are maintained in proper engagement I prefer that the lever be provided with a depending lip 5ª, the lower end of which is recessed to receive the upper end of the trip, thus preventing the lever from slipping off the trip during its operation. To retain each section of the controlling device firmly in position while the section is in operative relation to the actuating levers I have provided a supporting plate 60 over which the sections move as they approach and leave their operative positions and have provided guide strips 61 arranged at the sides of and above the plate 60 where they will engage the outer ends of the sections and thus hold the sections firmly in engagement with the supporting plate 60, thereby preventing vibration or displacement of the sections.

Suitable means are provided whereby the tripping devices may be quickly and readily set in their adjusted positions. In the present form of the device the flexible controlling device or chain extends about two or more series of drums or rotatable carriers 38 and 39 which are mounted upon shafts 40 and 41 arranged near the front and rear ends, respectively of the main frame 1. While I have shown but two drums it will be understood that I contemplate using one or more other drums to maintain the tension on the flexible controlling device. Inasmuch as the arrangement of this other drum is an ordinary one it seems unnecessary to illustrate the same. This arrangement of the supports for the controlling device causes the upper portion of the controlling device to be supported in a substantially straight line and I prefer that the setting up operation should take place on this part of the device. I have, therefore, mounted upon the rear end of the machine above the shaft 40 a bar 42 having secured thereto a gage 43 and provided with downwardly extending arms 44 in which the shaft 40 is journaled. Mounted upon the bar 42 is a finger 45 of a length substantially equal to the width of one of the sections 27 and so arranged that when moved across a section of the controlling device it will engage all the tripping devices carried thereby and move them to the edge of the controlling device so that they will occupy inoperative positions. A second finger 46 is also slidably mounted upon the rod 42 and when moved transversely to the controlling device will pick up one of the tripping devices and move the same along its guide to the desired position.

If desired the controlling device can be moved step by step to permit the successive trips to be placed in position but I prefer that the controlling device should be advanced by steps equal in length to the width of one of the sections and that the setting device itself should be advanced step by step to set the trips in each section of the controlling device. I have, therefore, provided the bar 42 at each end with screw-threaded apertures through which extend screw-threaded bolts 47 journaled in bearings 48 and 49 and each having at one end a bevel gear 50 meshing with a corresponding gear 51 on a shaft 52. Thus, when the shaft 52 is rotated the bar 42 will be moved a corresponding distance. Suitable means are provided for automatically controlling the distance which the bar 42 is advanced upon each operation of the shaft. In the present instance a half revolution of the shaft 52 is sufficient to advance the bar from one guide slot to the next and I have splined on the shaft a knurled nut 53 having on diametrically opposite sides thereof notches 54 adapted to engage a fixed locking finger 55. A spring 56 tends to hold the nut normally in engagement with the locking finger. When it is desired to actuate the shaft the nut is retracted against the tension of the spring and rotary movement imparted thereto. As soon as the initial movement has been imparted to the nut it is released and permitted to move under the tension of the spring 56 against the end of the locking finger. Thus, when it has completed its half revolution the second notch 54 will be caused to engage the locking finger and automatically stop the bar 42 in its adjusted position.

If desired the length of the controlling device or chain may be shortened or lengthened to accommodate the same to letters of different length, this being done by the removal or insertion of one or more sections 27. This adjustment makes necessary the adjustment of the supporting drum 38 and the setting up device which is connected therewith. To this end the bearings for the shaft 40 are adjustable and inasmuch as these bearings carry the arms 44 on which the gage and its coöperating devices are mounted it will be apparent that when the bearings for the shaft 40 are adjusted the whole mechanism will be adjusted. This adjustment is secured by causing the shaft 40 to extend outward beyond the bearings in the arms 44 and providing the lower frame member, shown at 58, with notches 59 to receive the respective ends of the shaft and providing the bearings with brackets 57 which project over the adjacent frame members and are secured thereto by screws to hold the arms 44 against movement about the axis of the shaft.

Figure 1:
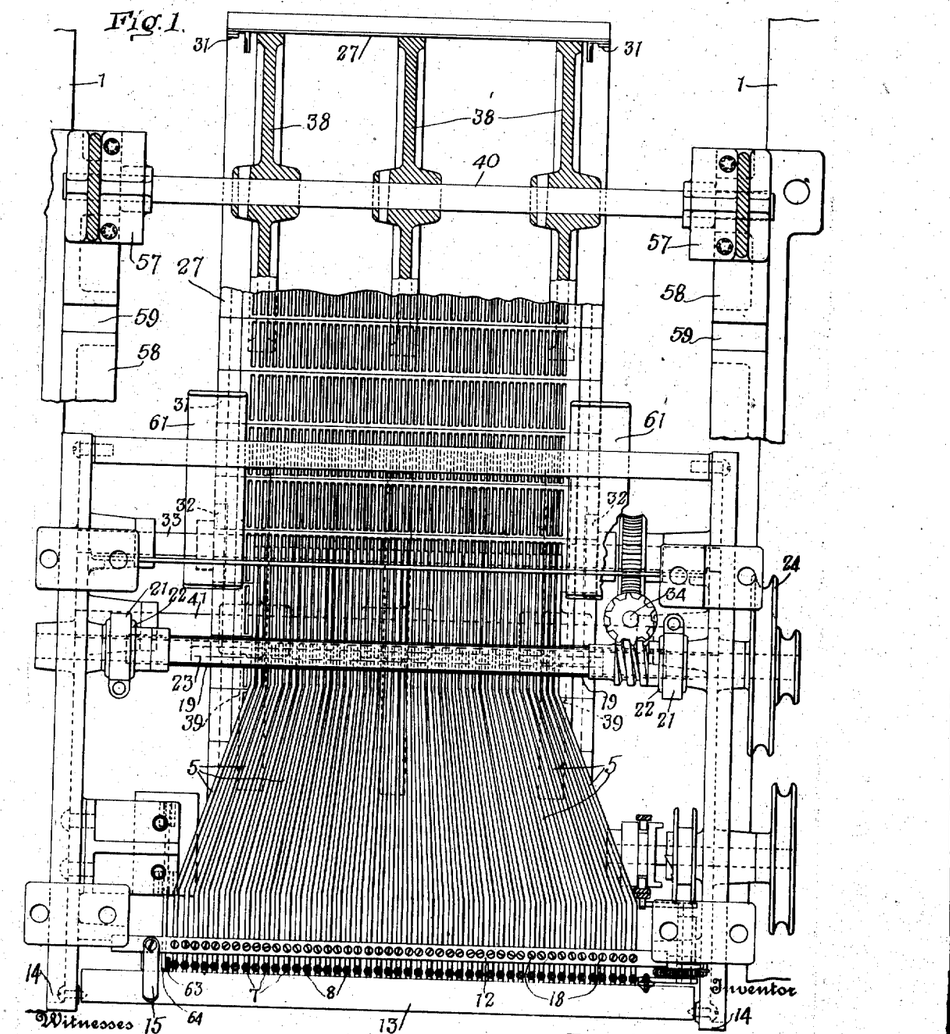
Figure 1 is a top, plan view of a device embodying my invention with the typewriter removed.
Figure 2:
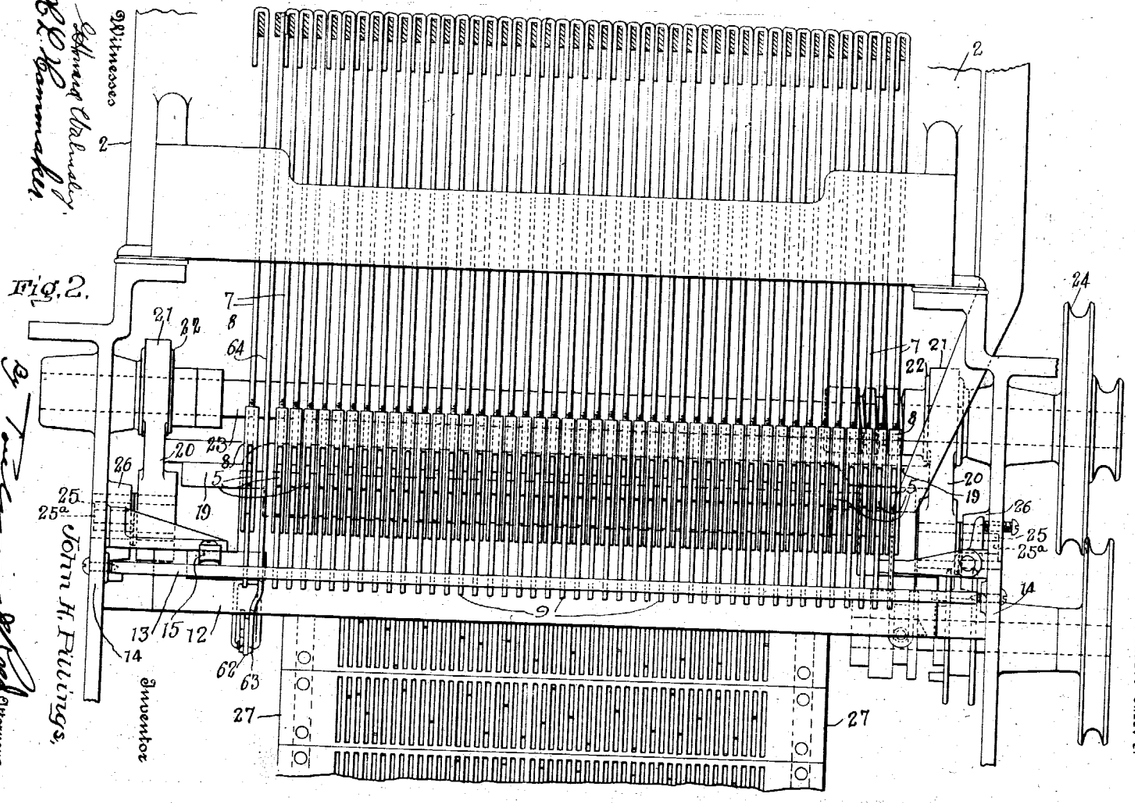
Fig. 2 is a front elevation of a portion of such a device.
Figure 3:
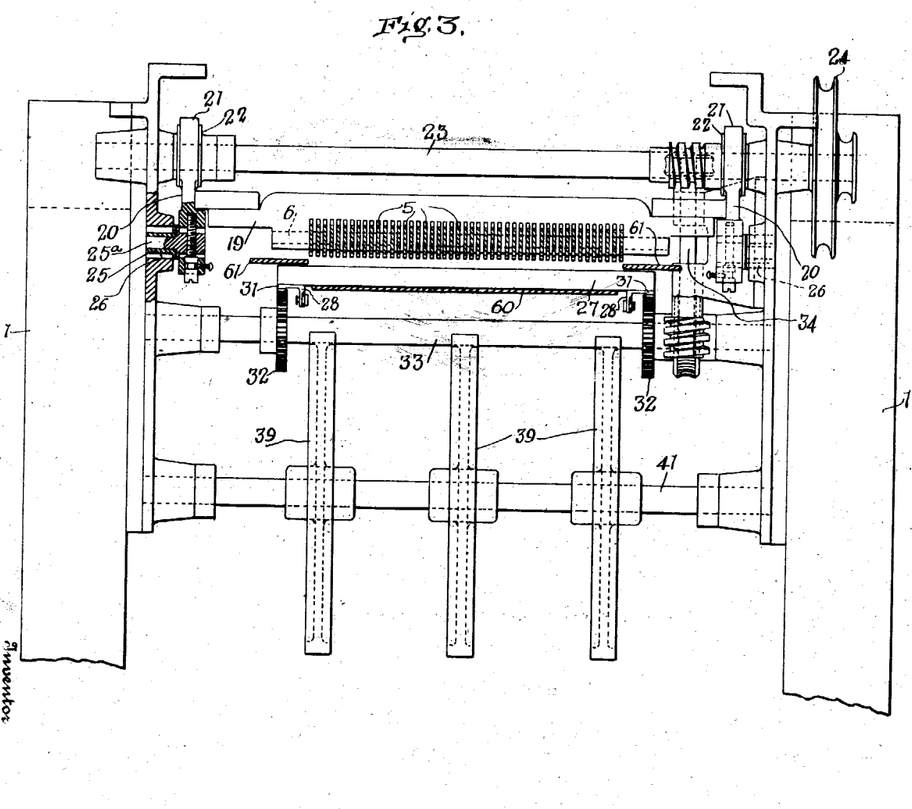
Fig. 3 is a transverse, sectional view, taken vertically of the device.
Figures 4, 5:
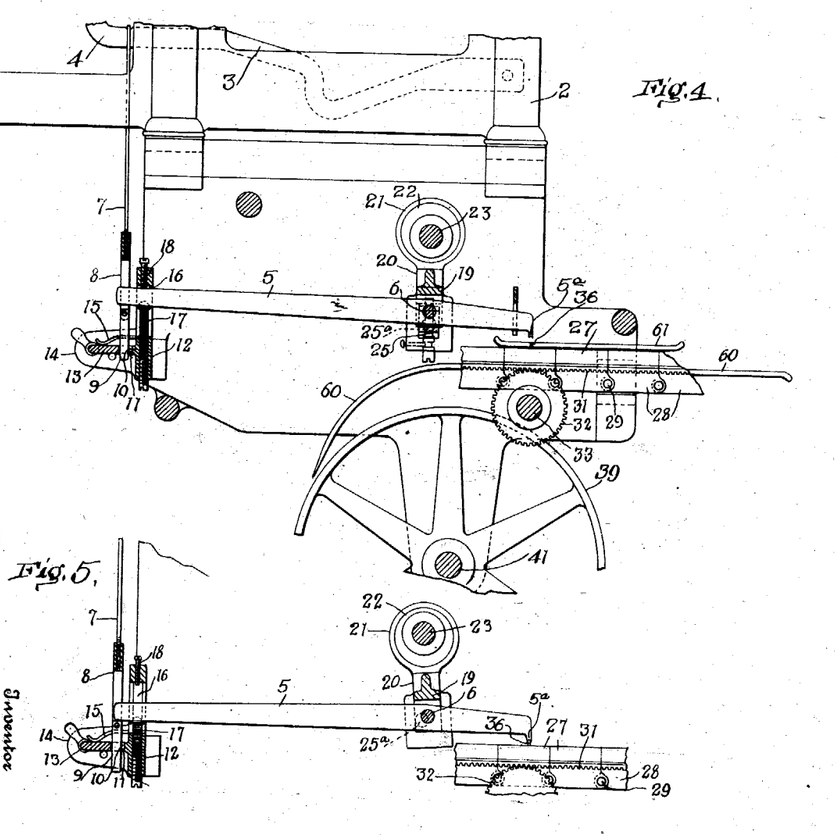
Fig. 4 is a longitudinal, sectional view taken vertically of the device showing the actuating lever in its normal position.
Fig. 5 is a detail view of a portion of the mechanism showing the actuating lever in the position to which it is moved to actuate the type bar.
Figure 6:
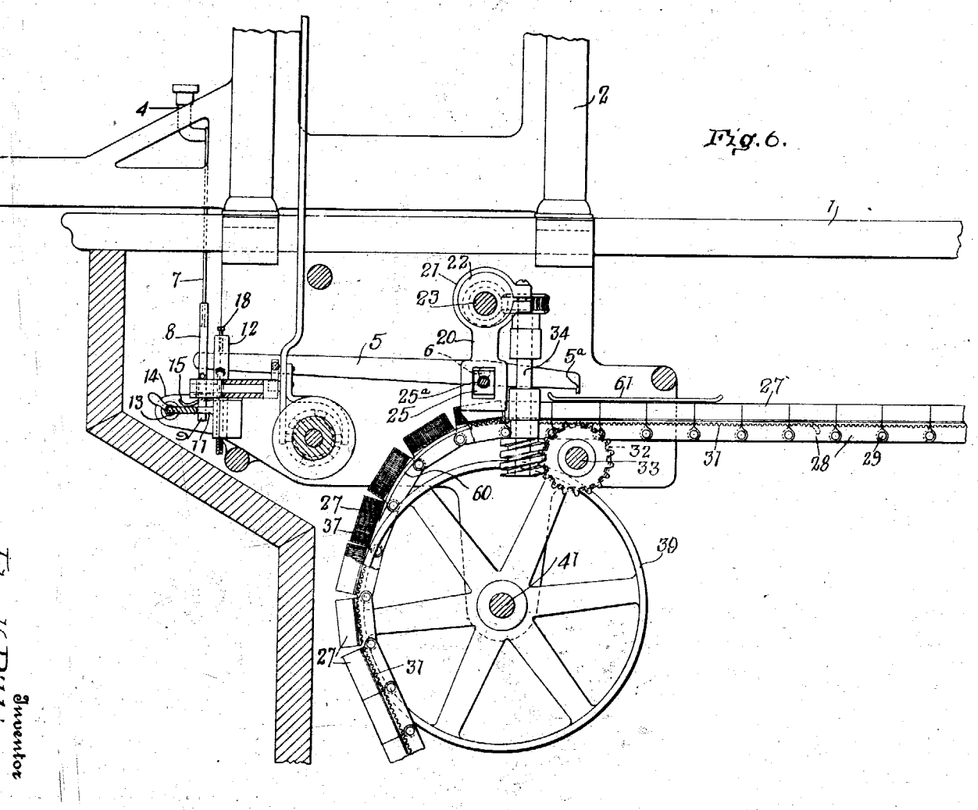
Fig. 6 is a vertical, sectional view taken just inside the main frame of the machine.
Figures 7, 8:
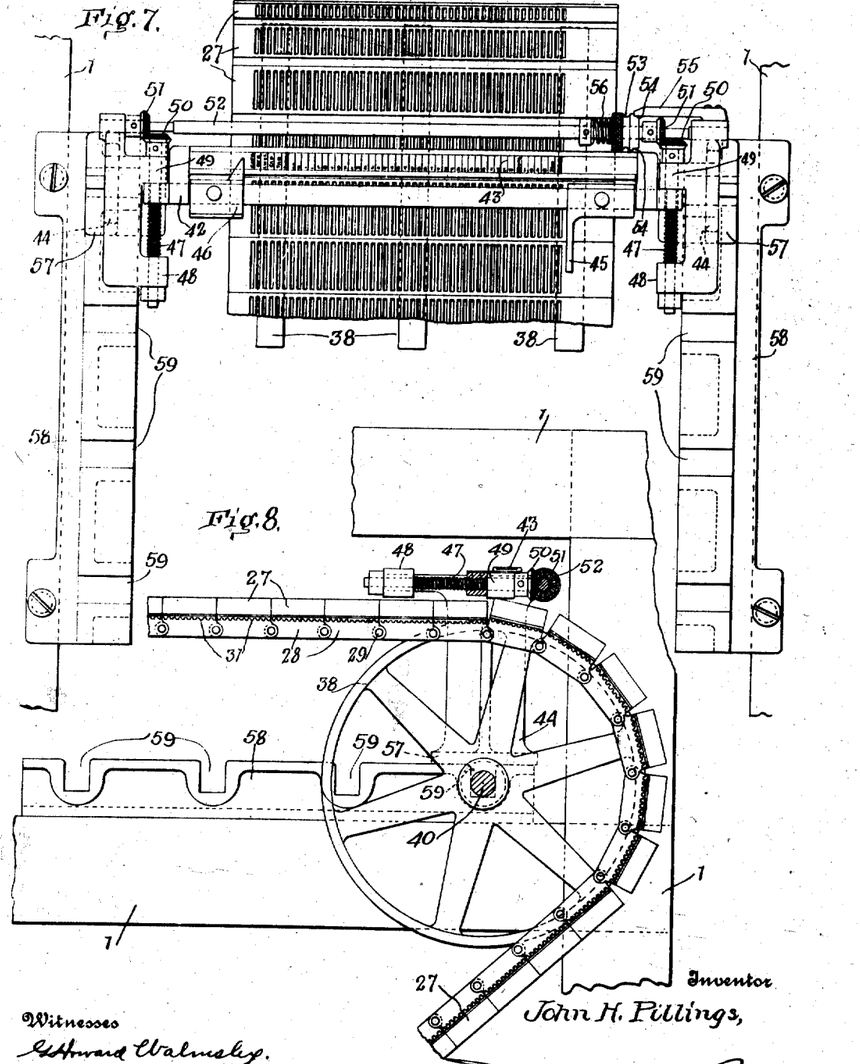
Fig. 7 is a plan view of the rear portion of the machine.
Fig. 8 is a longitudinal, sectional view of the rear portion of the machine.
Figure 9:
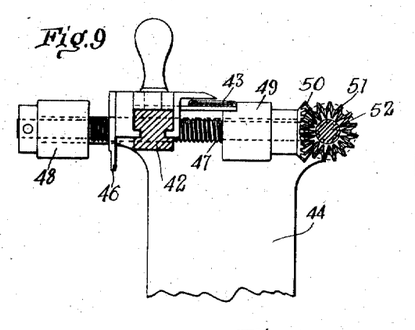
Fig. 9 is a detail, sectional view showing the adjusting device for the gage and the device for setting the tripping devices.
Figure 10:
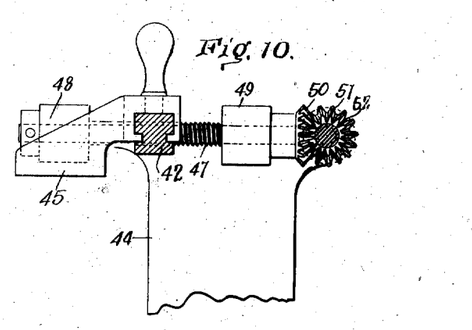
Fig. 10 is a similar view showing the device for moving the tripping devices into their inoperative positions.
Figures 11, 12, 13, 14, 15:
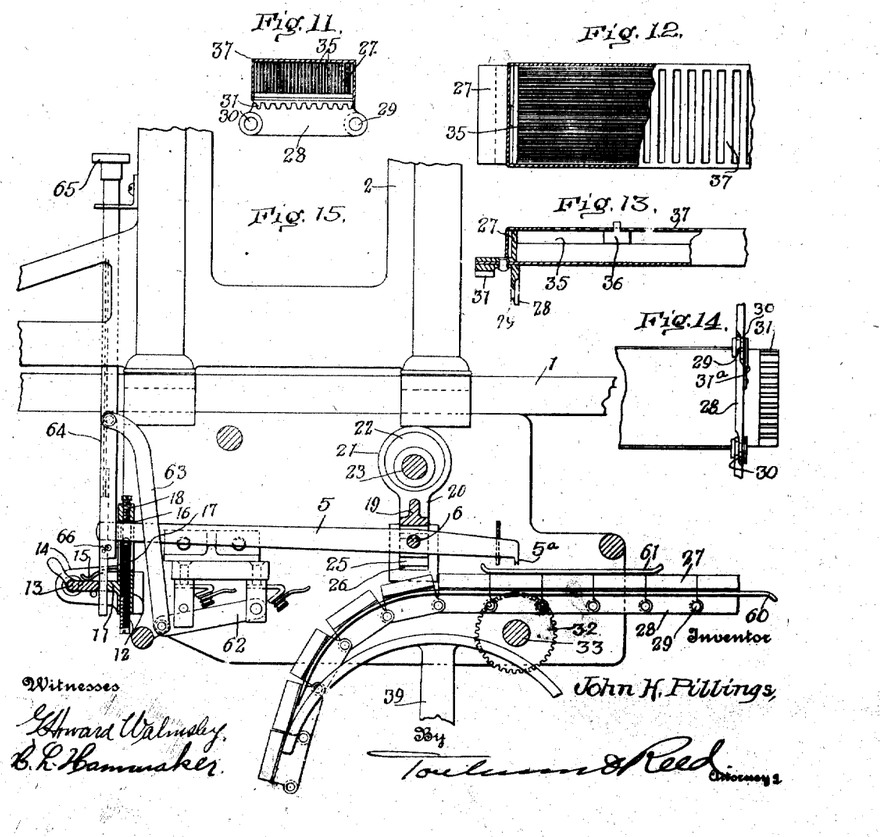
Fig. 11 is a sectional view taken transversely of one section of the controlling device.
Fig. 12 is a plan view, partially broken away, of a portion of such a section.
Fig. 13 is a longitudinal, sectional view of a portion of one of said sections.
Fig. 14 is a bottom, plan view of a portion of one of said sections.
Fig. 15 is a longitudinal, sectional view showing in elevation the automatically controlled switch for stopping the machine.

I have also provided means whereby the mechanism may be automatically stopped at any desired point. To this end I have provided an automatic switch which may be operated by a key to start the motor and which may be operated either by the key or by one of the actuating levers 5 to stop the motor. This switch is here shown at 62 as an ordinary knife switch, the free end of which is connected by a link 63 with a vertically extending key bar 64 having at its upper end a key 65 arranged in a convenient position on the key board. It will be noted that the arrangement of this key is such that an upward pull on the same must be exerted to actuate the switch. With this arrangement it is impossible for the operator, in operating the typewriter manually, to start the apparatus should she inadvertently strike the starting key. The key bar is provided near its lower end with a pin 66 which projects beneath the corresponding actuating lever 5 and when this lever is forced down, in the manner above described, the switch will be forced open and the operation of the machine stopped.

The operation of the mechanism will be readily understood from the foregoing description and it will be apparent that the mechanism is an exceedingly simple one comprising a single series of levers which are arranged to directly engage the device which controls the selective operation of these levers. Consequently, the number of parts required is greatly reduced which not only reduces the expense of manufacture but greatly simplifies the machine itself, renders the same less liable to breakage or disarrangement which is an important factor in the operation of a machine of this kind.

While I have shown and described one embodiment of my invention it will be understood that this has been chosen for the purposes of illustration only and that I do not desire to be limited to the details of construction shown and described, for obvious modifications will occur to a person skilled in the art. Further, I wish it to be understood that while I have shown and described the invention as applied to a typewriter, this has been done for the purpose of illustration only and the invention is applicable to machines of various kinds.

Having thus fully described my invention, what I claim as new and desire to secure by Letters Patent, is:—

1. The combination with a machine having a plurality of operable parts, of a series of actuating members operatively connected with the respective operable parts of said machine and each capable of two movements of different kinds, one an operative movement to cause the operation of the connected part of said machine and the other an inoperative movement, operating means acting on said actuating members and capable of imparting thereto movement of either kind, and a device to control the kind of movement imparted to each actuating member.

2. The combination with a machine having a plurality of operable parts, of a series of actuating members operatively connected with the respective operable parts of said machine and each capable of two movements of different kinds, one an operative movement to cause the operation of the connected part of said machine and the other an inoperative movement, operating means acting on said actuating members and capable of imparting thereto movement of either kind, of a controlling device to cause the operative movement of said actuating members in a predetermined sequence.

3. The combination with a machine having a plurality of parts, of a series of actuating members operatively connected with the respective operable parts of said machine and each capable of two movements of different kinds, one an operative movement to cause the operation of the connected part of said machine and the other an inoperative movement, means acting normally on said actuating member to impart inoperative movement thereto, and a controlling device acting automatically on said members to transform said inoperative movement into operative movement.

4. The combination, with a typewriter, of an actuating bar operatively connected near one end with an operable part of said typewriter, means for continuously imparting transverse reciprocatory movement to said bar and causing the same to fulcrum about that end which is connected with said typewriter, the other end of said bar being free to move in the line of said reciprocatory movement, and means to interrupt the movement of the last-mentioned end of said bar and cause said bar to fulcrum about said last-mentioned end and cause movement to be imparted to that end thereof which is connected with said typewriter.

5. The combination, with a typewriter, of an actuating lever, means pivotally connected with said lever between its ends to impart transverse movement thereto, one end of said lever being operatively connected with said typewriter and normally held against operative movement, the other end of said lever being normally free to move, and means to automatically interrupt the movement of the last-mentioned end of said lever and thereby cause operative movement to be imparted to the first-mentioned end thereof.

6. The combination, with a typewriter, of an actuating lever, means connected with said lever between its ends to impart transverse movement thereto, one end of said lever being operatively connected with said typewriter, a spring to hold said lever normally against operative movement, the other end of said lever being normally free to move, and means to interrupt the movement of said last-mentioned end of said lever and cause the other end thereof to move against the tension of said spring.

7. The combination, with a typewriter having a plurality of operable parts, of a plurality of actuating members operatively connected with the respective operable parts of said typewriter, each of said members being capable of both an operative movement and an inoperative movement, means to impart continuous movement to said actuating members, and a controlling device to convert the movement of selected ones of said actuating members into operative movement.

8. The combination, with a typewriter having a plurality of operable parts, of a plurality of actuating levers, means connected with said levers between their ends to impart movement thereto, a fixed member having slots through which said levers project, springs engaging the respective levers to hold the same normally in the upper portions of their respective slots, means for connecting those portions of said levers adjacent to said slotted member with the respective operable parts of said typewriter, whereby the normal movement of said levers will cause the same to fulcrum about that portion extending through said slotted member, and means for acting on each lever to cause that portion thereof which extends through said slotted member to be moved against the tension of said springs and thus actuate said typewriter.

9. The combination, with a typewriter having a plurality of operable parts, of a plurality of actuating members connected with the respective operable parts of said typewriter, a movable controlling device having a part adapted to be moved into operative relation with one of said actuating members, and means for imparting movement to said actuating member in one direction to cause it to engage said controlling device and in another direction to cause it to move with said controlling device to maintain said parts in engagement.

10. The combination, with a typewriter having a plurality of operable parts, of a plurality of actuating devices operatively connected with the respective operable parts of said typewriter, means for imparting both transverse and longitudinal movement to said actuating member, and a controlling device movable longitudinally of said members and having parts adapted to be moved into operative relation with the respective actuating members to control the transverse movement thereof.

11. The combination, with a typewriter having a plurality of operable parts, a plurality of actuating levers operatively connected with the respective operable parts of said typewriter, a shaft extending transversely of said actuating levers between their ends and forming a support therefor, an arm arranged at each end of said shaft, connected thereto and having its upper end connected with an eccentric, and slide blocks pivotally connected to the lower ends of said arms, the center of the connection between said arms and said slide blocks being out of alinement with the center of said shaft, thereby causing said eccentrics to impart both transverse and longitudinal movements to said levers, and a controlling device movable longitudinally of said levers and having parts adapted to be engaged thereby.

12. An automatic operating mechanism, comprising an actuating member having one end connected with a part to be operated and held normally against movement and having its other end normally free to move, operating means connected with said actuating member between its ends to impart transverse movement thereto, and means acting automatically to prevent the movement of the last-mentioned end of said actuating member and thereby cause movement to be imparted to that end thereof which is connected with the part to be operated.

13. An automatic operating mechanism, comprising an actuating lever having one end connected with a part to be operated and held normally against movement and having its other end normally free to move, means to impart transverse movement to said lever, and means acting automatically to prevent the movement of the last-mentioned end of said lever and thereby cause movement to be imparted to that end thereof which is connected with the part to be operated.

14. An operating mechanism comprising an actuating lever, means pivotally connected with said lever between its ends to impart continuous transverse movement thereto, one end of said lever being normally held against operative movement, the other end of said lever being normally free to move, and means to interrupt the movement of the last-mentioned end of said lever and thereby cause operative movement to be imparted to the first-mentioned end thereof.

15. An operating mechanism comprising an actuating lever, means pivotally connected with said lever between its ends to impart continuous transverse movement thereto, one end of said lever being normally held against operative movement, the other end of said lever being normally free to move, and means to automatically interrupt the movement of the last-mentioned end of said lever and thereby cause operative movement to be imparted to the first-mentioned end thereof.

16. In an operating mechanism, the combination, with selective actuating mechanism, of a controlling device for said selective actuating mechanism comprising a plurality of sections connected one to the other and each having a series of parallel transverse guides, and projecting devices carried by said guides and held against displacement.

17. The combination, with a typewriter, and selective actuating mechanism for said typewriter, of a controlling device for said actuating mechanism comprising a plurality of sections each having a series of transverse guides, and tripping devices carried by said sections and adjustable along the respective guides.

18. The combination, with a typewriter, and a selective actuating mechanism for said typewriter, of a controlling device for said actuating mechanism comprising a plurality of sections each having a series of slots extending transversely to the line of movement of said sections, and tripping devices mounted in said slots.

19. The combination, with a typewriter, and selective actuating mechanism for said typewriter, of a controlling device for said actuating mechanism comprising a plurality of sections each having a series of slots extending transversely to the line of movement of said sections, tripping devices adjustably mounted in said slots, and means carried by each section to retain said tripping devices in their adjusted positions.

20. A controlling device composed of a series of sections, each section having one or more transverse guides, tripping devices adjustable along said guides, and means to retain said tripping devices in their adjusted positions.

21. A controlling mechanism comprising a plurality of sections, each section having a series of slots extending transversely to its line of movement, tripping devices mounted in said slots, a cover plate for each section having slots extending transversely to the first-mentioned slots and adapted to receive said tripping devices to hold the same against lateral displacement.

22. The combination, with a typewriter, actuating mechanism for said typewriter, and means for operating said actuating mechanism, of a controlling device for said actuating mechanism comprising a plurality of sections connected one to the other, toothed racks carried by the respective sections, a pinion to mesh with said racks and impart movement to said controlling device, and means connected with the operating means for said actuating mechanism to rotate said pinions, thereby moving said controlling device in timed relation with said actuating mechanism.

23. The combination, with a typewriter having a key bar, of an actuating member, a link connecting said actuating member with said key bar and having a finger, a fixed part having a slot to receive said finger and guide said link in its movement, and a movable device to close said slot to retain said finger normally within the same.

24. The combination, with a typewriter having a plurality of operable parts, of a plurality of actuating members, links to connect said actuating members with the respective operable parts of said typewriter, each link having a finger projecting beyond the end of the same, a bar having a series of open-ended slots to receive and guide the respective fingers, and a bar pivotally supported along the open ends of said slots and movable into and out of alinement therewith.

25. The combination, with a typewriter, and actuating mechanism therefor, of a controlling device comprising a movable member having a series of transverse guides, a gage extending transversely to said controlling device, and means to advance said gage step by step to enable the tripping devices to be adjusted along their respective guides.

26. The combination, with a typewriter, and actuating mechanism therefor, of a controlling device comprising a movable member having a series of transverse guides, a bar extending transversely to said controlling device and having screw-threaded apertures, a gage carried by said bar, screw-shafts extending through said apertures, a shaft extending transversely to said controlling device and geared to the respective screw shafts, means for rotating said last-mentioned shaft and for automatically interrupting the movement thereof at predetermined intervals.

27. The combination, with a typewriter, and actuating mechanism therefor, of a controlling device for said actuating mechanism comprising a plurality of sections united to form an endless chain, said sections being separable to enable the length of said chain to be varied, supporting drums for said chain, shafts for said supporting drums, and frame members each having a series of fixed bearings to receive the ends of one of said shafts and accommodate its drum to the variations in the length of said chain.

In testimony whereof, I affix my signature in presence of two witnesses.

JOHN H. PILLINGS.

Witnesses:
F. W. SCHAEFER,
H. L. HAMMAKER.